United States Patent

Hamasaki

Patent Number: 5,307,104
Date of Patent: Apr. 26, 1994

[54] DEVICE FOR ADJUSTING AXIAL POSITION OF LENS

[75] Inventor: Takuji Hamasaki, Tokyo, Japan

[73] Assignee: Asahi Kogaku Kogyo Kabushiki Kaisha, Tokyo, Japan

[21] Appl. No.: 885,367

[22] Filed: May 19, 1992

[30] Foreign Application Priority Data

May 20, 1991 [JP] Japan ............................ 3-214849

[51] Int. Cl.$^5$ ............................................ G03B 17/00
[52] U.S. Cl. ................................ 354/286; 354/195.1
[58] Field of Search .......................... 354/195.1, 286; 359/702, 822, 826

[56] References Cited

U.S. PATENT DOCUMENTS 2,691,322 10/1954 Wittel .
4,252,411 2/1981 Nomura .
4,668,047 5/1987 Okura .

FOREIGN PATENT DOCUMENTS 53-43336 4/1978 Japan .
55-6967 1/1980 Japan .

OTHER PUBLICATIONS

English Abstract of Japanese Patent No. 53-43336.
English Abstract of Japanese Patent No. 55-6967.

Primary Examiner—Monroe H. Hayes
Attorney, Agent, or Firm—Sandler Greenblum & Bernstein

[57] ABSTRACT

A device for adjusting an optical axial position of a lens is disclosed. The device includes a lens frame for mounting at least one lens, a lens frame supporting member rotatably engaged with the lens frame via screw threads for supporting the lens frame in such a way that the lens frame is rotatable relative to the lens frame supporting member, coupled to a stationary member for adjustment of the optical axial position of the lens relative to the stationary member. Set screws are provided for selectively locking the lens frame to the lens frame supporting member at one of a plurality of stepwise, predetermined, relative angular positions between the lens frame and the lens frame supporting member after the optical axial position of the lens has been adjusted relative to the lens frame supporting member. Since the lens frame can be locked to the lens frame supporting member at one of the plurality of stepwise, predetermined, relative angular positions by use of the set screws after the optical axial position of the lens has been adjusted, it is possible to improve the locking reliability and simplify the structure of the adjusting device.

8 Claims, 2 Drawing Sheets

DEVICE FOR ADJUSTING AXIAL POSITION OF LENS

BACKGROUND OF THE INVENTION

1. Field of the Invention

This invention relates to a device for adjusting the optical axial position of a lens, and more specifically to a device for adjusting the position of a lens in the optical axial direction thereof when the lens is assembled and adjusted into a complete optical unit.

2. Description of the Prior Art

When the lens or lenses are assembled into an optical unit, the position of a lens mounted in a lens barrel must be adjusted in the optical axial direction thereof, for effecting infinite focus distance adjustment, zooming adjustment, back focus distance adjustment, and the like. The lens barrel normally has a cylindrical stationary member to be coupled to a body of the optical unit, a lens frame supporting member coupled to the stationary member through helicoidal threads, and a lens frame to which a lens is to be mounted and which is coupled to the lens frame supporting member through screw threads.

The most conventional way of adjusting the optical axial position of the lens, is to extend or retract the lens frame axially relative to the lens frame supporting member, whenever the lens frame is rotated with respect to the lens frame supporting member.

In the above-mentioned method, it is possible to adjust the axial position of the lens continuously or steplessly relative to the lens frame supporting member by adjusting the amount of the thread engagement between the lens frame and the lens frame supporting member. After being adjusted, the lens position must be locked by means of an appropriate locking mechanism.

Conventionally, various lens frame locking mechanisms have so far been adopted as follows:

In a first example, a lens is mounted on a lens frame, the lens frame is engaged via screw threads with a lens frame supporting member (e.g., focusing ring), and the lens frame supporting member is coupled to a stationary member through helicoidal threads. After the lens frame has been adjusted relative to the lens frame supporting member by adjusting the amount of the thread engagement between the lens frame and the lens frame supporting member, a spacer washer having a selected thickness is sandwiched between a flange of the lens frame supporting member and a flange of the lens frame. Thereafter the lens frame is tightly screwed against the lens frame supporting member to lock the lens frame to the lens frame supporting member.

In this first example, however, there exist problems which result from the fact that the thickness of the spacer washer must be carefully selected and the lens frame must be removed from the lens frame supporting member before sandwiching the selected spacer washer between those two parts.

In a second example, after the lens frame has been adjusted relative to the lens frame supporting member in such a manner as stated above, the lens frame is locked by use of an additional locking unit. The additional looking unit is a locking nut which is to be screwed to an inner thread formed in the lens frame supporting member, whereby the rotational movement of the lens frame with respect to the lens frame support member is restricted by fastening the locking nut against the lens frame.

In this second method, however, there exist other problems. Namely, a special jig is required to screw the locking nut. As a result, the lens frame is likely to be dislocated or the lens is likely to be scratched when the locking nut is fastened too tightly toward the lens frame.

In a third example, after the lens frame has been adjusted relative to the lens frame supporting member, the lens frame is fixed to the lens frame supporting member by screwing a set screw or set screws from the outer circumferential surface of the lens frame supporting member to the lens frame in the radial direction of the lens.

Again, problems exist as a result of using the third method. Namely, the lens frame or the lens frame supporting member is likely to be deformed when the set screws are fastened too tightly.

SUMMARY OF THE INVENTION

With these problems in mind, it is therefore the primary object of the present invention to provide a device for adjusting the optical axial position of a lens mounted on a lens frame with respect to a lens supporting member, which is simple in structure, yet highly accurate in adjusting precision, and excellent with regard to locking reliability.

To achieve the above-mentioned object, a device for adjusting the optical axial position of a lens according to the present invention, includes a lens frame for mounting the lens; a lens frame supporting member having two ends, at least one lens frame supporting member being at one end thereof to be coupled to a stationary member and at the other end thereof rotatably engaged with the lens frame via screw threads for supporting the lens frame in such a way that the lens frame is rotatable relative to the lens frame supporting member for adjusting the optical axial position of the lens relative to the stationary member; and means for selectively locking the lens frame to the lens frame supporting member at one of a plurality of stepwise, predetermined, relative angular positions between the lens frame and the lens frame supporting member after the optical axial position of the lens has been adjusted relative to the lens frame supporting member by adjustably rotating the lens frame with respect to the lens frame support member.

The conceptual basis of the present invention results from the fact that it is possible to realize a lens axial position adjusting device which has a simple structure and excellent locking reliability even when the optical axial position of the lens is adjusted in stepwise fashion. In addition, the present invention is free from problems with respect to adjustment precision even though the optical axial position of the lens is adjusted in stepwise fashion.

In the lens axial position adjusting device according to the present invention, the optical axial position of the lens mounted on the lens frame can be adjusted by rotating the lens frame relative to the lens frame supporting member. After the optical axial position of the lens has been adjusted, the lens frame is locked with the lens frame supporting member by the selective locking means at one of the plurality of stepwise, predetermined angular positions between the lens frame and the lens frame supporting member. The selective locking means is preferably composed of set screws, tapped holes formed in the lens frame, and a plurality of lock recesses formed in the lens frame supporting member. The screws are adapted to be engaged with any of the lock recesses through the tapped holes at or in the close vicinity of the adjusted position between the lens frame and the lens frame supporting member.

Therefore, since the lens frame can be locked to the lens frame supporting member at one of the stepwise, predetermined, relative angular positions by means of the set screws, after the lens frame has been adjustably rotated relative to the lens frame supporting member to complete adjustment of the optical axial position of the lens, it is possible to simplify the structure of the device and improve the locking reliability without deteriorating the adjusting precision.

According to the present invention, a preferred embodiment has 45 lock recesses arranged on the lens frame supporting member along the circumferential direction thereof at 8 degree intervals. There are three tapped holes arranged on the lens frame along the circumferential direction thereof at 120 degree intervals, such that the three holes mate with any of three recesses of the lens frame supporting member.

DETAILED DESCRIPTION OF THE PREFERRED EMBODIMENTS

Embodiments of the device according to the present invention will be described hereinbelow with reference to the attached drawings.

Figure 1:
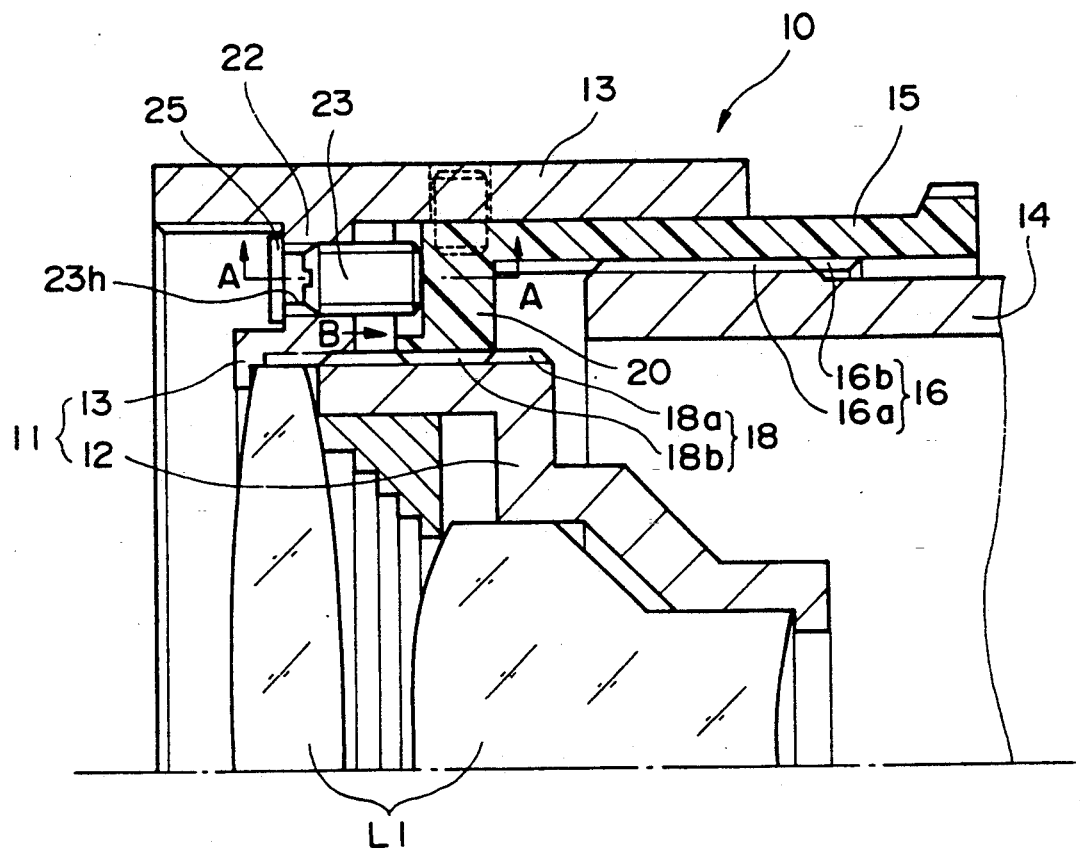
FIG. 1 is a partial cross-sectional view showing a first embodiment of a device for adjusting the optical axial position of a lens according to the present invention.

FIG. 1 shows a first embodiment which is applied to a device for adjusting the optical axial position of a group of focusing lenses L1 mounted on the frontmost position of a lens barrel 10. The lens barrel 10, which is to be coupled to a body of an optical unit, includes a lens frame 11 having a lens mounting member 12 and a lens retaining member 13 by which the lenses L1 are mounted; a substantially cylindrical lens frame supporting member (focusing ring) 15; and a substantially cylindrical stationary member 14. The lens mounting member 12 of the lens frame 11 engages with the focusing ring 15 through single fine threads 18. The focusing ring 15 engages with the stationary member 14 via helicoidal threads 16. The lens frame 11 to which the lenses L1 are mounted is locked to the focusing ring 15 after the optical axial position of the lenses L1 has been adjusted relative to the focusing ring 15 by rotating the lens frame 11 with respect to the focusing ring 15 via the single fine screw threads 18.

Specifically, the focusing lenses L1 are fixedly bonded between the lens mounting member 12 and the lens retaining member 13. The lens mounting member 12 has a cylindrical portion, and an extra small, single, male screw thread 18a is formed on the outer circumferential surface of the cylindrical portion. The focusing ring 15 has an inwardly extending flange 20 having an inner circumferential surface and located around the cylindrical portion of the lens mounting member 12. An extra small, single, female screw thread 18b is formed on the inner circumferential surface thereof so as to engage with the male screw thread 18a of the lens mounting member 12. Further, the focusing ring 15 is formed with female helicoidal threads 16b on the inner circumferential surface thereof. The stationary member 14 is formed with male helicoidal threads 16a on the outer circumferential surface thereof so as to engage with the female helicoidal threads 16b of the focusing ring 15.

Figure 2:
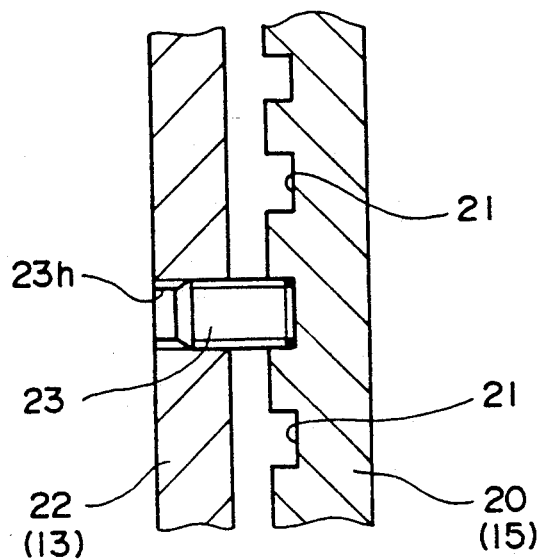
FIG. 2 is an enlarged cross-sectional view taken from the direction of arrow A shown in FIG. 1.
Figure 3:
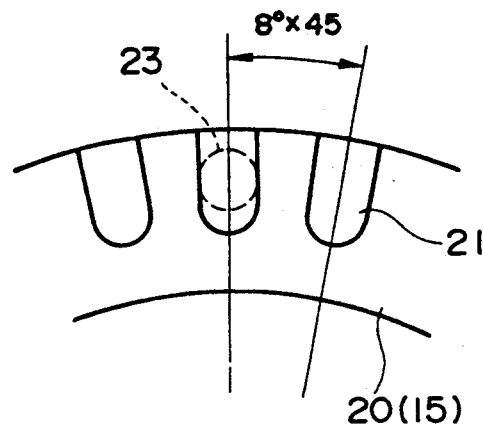
FIG. 3 is an enlarged plane view taken from the direction of arrow B shown in FIG. 1.

On the front end surface of the inwardly extending flange 20 of the focusing ring 15 (left side in FIG. 1), there are formed a plurality of lock recesses or grooves 21, as depicted in FIG. 2. In this embodiment, 45 lock recesses 21, each of which has a U-shaped configuration extending in the radial direction of the focusing ring 15 and recessed in the axial direction thereof, are arranged at regular 8 degree angular intervals in the front end surface of the focusing ring 15 along the circumferential direction thereof, as is partially shown in FIG. 3.

Figure 4:
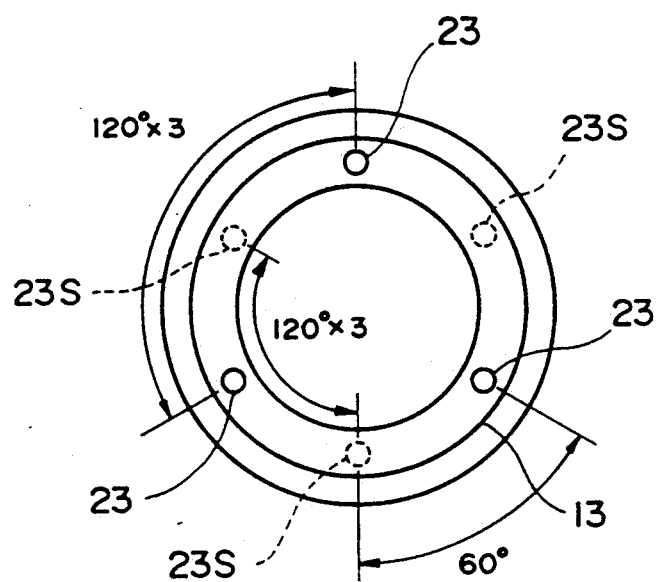
FIG. 4 is a plane view showing the flange of the lens frame (lens retaining member) for assistance in explaining an example of set screw arrangement positions for the first embodiment, in which another set screw arrangement positions for a second embodiment are shown by dashed circles.

Further, the lens retaining member 13 is provided with an inwardly extending flange 22 so as to face the flange 20 of the focusing ring 15 when assembled. In the extending flange 22 of the lens retaining member 13, there are formed a plurality of tapped holes 23h (shown in FIG. 2). In this embodiment, 3 tapped holes 23h, each of which extends in the axial direction of the lens frame 11, are arranged at regular 120 degree angular intervals in the flange 22 of the lens retaining member 13 along the circumferential direction thereof. Several set screws 23 (for example, 3) are screwed into the tapped holes 23h formed in the flange 22 of the lens retaining member 13, as shown in FIG. 4. The angular positions of these tapped holes 23h are determined so as to match the arrangement positions of the lock recesses 21. In other words, the mutual, angular, positional relationship between the tapped holes 23h and the lock recesses 21 is determined in such a way that the set screws 23 can enter the lock recesses 21 through the tapped holes 23h at any angular position.

Furthermore, the set screws 23 are arranged in such positions so as to be fastenable from the front side (left side in FIG. 1) of the lens frame 11.

The focusing ring 15 formed with plural lock recesses 21 is preferably manufactured by molding resin material, because molded parts are easy to manufacture and have high dimensional precision.

The procedure of adjusting the optical axial position of the lenses L1 will be described hereinbelow.

First, the focusing ring 15 is set or assumed to be set to a predetermined position (e.g., infinite focus distance) relative to the stationary member 14 through the helicoidal threads 16. Thereafter, the optical axial position of the lens frame 11 is adjusted relative to the stationary member 14 or a fixed position (such as a certain position on a film plane) by adjustably rotating the lens frame 11 relative to the focusing ring 15, under the condition that the set screws 23 are not projected from the rear (right side in FIG. 1) end surface of the inner flange 22 of the lens retaining member 13 toward the lock recesses 21 of the focusing ring 15. In this procedure, it is possible to adjust the optical axial position of the lenses L1 by using a collimator as a guide, for example.

After the lens position has been adjusted, the set screws 23 are fastened into the lock recesses 21. At this moment, the positions of the set screws 23 may not match the positions of the lock recesses 21. In this case, the lens frame 11 may be rotated (e.g., less than the angular pitch [8 degrees, in this embodiment] of the lock recesses 21) in either of the clockwise or counter clockwise direction in order to match the set screws 23 with the lock recesses 21, before the set screws 21 are fastened into the lock recesses 21 and against the focusing ring 15. Under these conditions, since the lens frame 11 can be fixed to the focusing ring 15, the adjustment of the optical axial position of the lens group L1 is completed.

Thereafter, it is preferable to attach a sealing member 25 on the front end surface of the inner flange 22 of the lens retaining member 13 to cover the tapped holes 23h.

The adjustment or regulation precision of the present invention will be discussed below. When the lock recesses 21 are arranged at regular angular intervals of 8 degrees (i.e., when there are 45 lock recesses 21) and the pitch of the single screw threads 18 is 0.5 mm, the lens frame 11 is shifted in the optical axial direction thereof by 0.011 mm whenever the lens frame 11 is rotated relative to the focusing ring 15 from one lock recess 21 to another adjacent lock recess 21. This relationship is represented by the following formula:

$$(8 \text{ degrees}/360 \text{ degrees}) \times 0.5 \text{ mm} \approx 0.011 \text{ mm}$$

This shift rate is sufficient for the precision required when an ordinary lens focus is adjusted. For example, the assumption made is that the lens is a zoom lens whose focal distance is 49 mm for the ordinary objective and 80 mm for the telephoto objective. In this case, the square of the ratio of the telephoto focal distance to the ordinary focal distance is $(80/49)^2 = 2.7$ Therefore, the deviation error of the focal distance on the film (i.e., screen) plane is at the worst:

$$0.011 \text{ mm} \times 2.7 \approx 0.03 \text{ mm}$$

This value is also negligible and therefore can be disregarded in the adjustment of the optical axial position of the zoom lens.

FIG. 4 shows another embodiment of the present invention, in which an additional three tapped holes are formed at regular angular intervals in the inner flange 22 of the presser ring 13, and three set screws 23S are screwed into these additional tapped holes. The additional set screws 23S are arranged with respect to the set screws 23 at a phase difference of ½ of the angular pitch (8 degrees) of the lock recesses 21 (i.e., 4 degrees). Thus, in the embodiment shown in FIG. 4, each of the additional three set screws 23S is offset by an offset angle of 4 degrees from each of the three set screws 23, respectively. As a result, according to this embodiment, it is possible to obtain a more precise adjustment for the optical axial position of the lenses.

Specifically, in this embodiment, only one group of set screws 23 or 23S is used for locking the lens frame 11 to the focusing ring 15, without the need to use all the six set screws. Since the additional group of phase shifted set screws 23S can be used, it is possible to reduce by half the regulating angular pitch of the lens frame 11 relative to the focusing ring 15, as compared with the first embodiment.

In general, if the angular pitch of the lock recesses 21 is B degrees and the axial pitch of the single screw threads 18 between the lens frame 11 and the focusing ring 15 is P mm, it is possible to stepwise adjust the optical axial position of the lens L1 by a step of (B degrees/360 degrees)×P mm.

Still further an additional group of set screws 23S can be arranged in relation to the set screws 23 with a phase difference of 1/N×B degrees (the angular pitch of the lock recesses), where N denotes an integer greater than or equal to two.

When the additional set screws 23S are used, it is possible to further reduce by 1/N the regulating or adjusting angular pitch of the lens frame 11 relative to the focusing ring 15, as compared with the first embodiment.

In the above-mentioned embodiments, 45 lock recesses are formed on the focusing ring 15 and 6 tapped holes, including the additional phased holes, are formed on the lens retaining member 13. However, according to the present invention, it is also possible to form 45 tapped holes on the focusing ring and 6 lock recesses on the lens retaining member 13, vice versa.

Further, in the above-mentioned embodiments, the set screws 23 are fastened in the direction parallel to the optical axis of the lens L1. Without being limited thereto, however, it is also possible to form the lock recesses or grooves on the outer circumferential surfaces of the focusing ring 15 and form tapped holes in the outer circumferential surface of the lens retaining member 13 in such a way that the set screws can be fastened from the outside of the lens retaining member 13 in the radial direction thereof, as illustrated by the dotted line in FIG. 1. In this case, it is preferable that each of the tapped holes in the lens retaining member 13 be formed into an elongated configuration in the axial direction of the lens retaining member in order to absorb any axial displacement of the lock recesses of the focussing ring 15 resulting from the threading motion thereof.

Finally, in the above-mentioned embodiments, the present invention has been described with respect to its application to a device for adjusting the optical axis position of a focusing lens. Without being limited thereto, however, it is of course possible to apply the device of the present invention to adjust the optical axial positions of any other lenses.

As described above, in the device for adjusting the optical axial position of a lens according to the present invention, the lens frame (presser ring) is rotated relative to the lens frame supporting member (focusing ring) in a stepwise manner for adjusting the optical axial position of the lens and then locked to the lens frame supporting member at one of the stepwise, predetermined, relative angular positions. Thereafter, by driving the set screws through the tapped holes formed in the lens frame into the lock recesses or grooves formed in the lens frame supporting member, it is possible to adjust the optical axis position of the lens simply and reliably, without deteriorating the adjustment or regulation precision.

Finally, it should be noted that the present disclosure relates to subject matter contained in Japanese Patent Application No. 3-214849 filed on May 20, 1991 which is expressly incorporated herein by reference in its entirety.

What is claimed is:

1. A device for adjusting an optical axial position of a lens, comprising:
    a lens frame for mounting at least one lens;
    a lens frame supporting member having opposite ends, said lens frame supporting member rotatably and adjustably coupled at one of said opposite ends to a stationary member and rotatably and threadably coupled to said lens frame at the other of said opposite ends, for supporting said lens frame in such a way that said lens frame is threadably rotatable relative to said lens frame supporting member for adjusting the optical axial position of the lens relative to said lens frame supporting member; and means for selectively locking said lens frame to said lens frame supporting member at one of a plurality of stepwise, predetermined relative angular positions between said lens frame and said lens frame supporting member after the optical axial position of the lens has been adjusted relative to said lens frame supporting member, wherein said selective locking means comprises a plurality of recesses formed at regular angular intervals along a circumference of said lens frame supporting member, a plurality of first tapped holes formed at other regular angular intervals along a circumference of said lens frame, and at least one set screw engageable through one of said tapped holes with any one of said recesses which is located in the closest association with the tapped hole at the adjusted position for locking said lens frame to said lens frame supporting member at any one of said plurality of stepwise, predetermined, relative angular positions.

2. The device of claim 1, said lens supporting member further comprising a flange having an end surface, and said lens frame further comprising a flange, wherein said recesses are formed in said end surface of said lens supporting member flange, and said tapped holes are formed in said lens frame flange, so as to extend in the axial direction of said lens frame.

3. The device of claim 2, wherein said lens supporting member flange end surface further comprises an outer circumferential surface, and said lens frame further comprises a cylindrical portion which substantially conforms to said outer circumferential surface of said lens frame supporting member flange when assembled, said recesses being formed in said outer circumferential surface of said lens supporting member so as to extend in the radial direction of said lens supporting member, and said tapped holes being formed in said cylindrical portion of said lens frame so as to extend in the radial direction thereof.

4. The device of claim 3, wherein each of said tapped holes is formed as an elongated hole in said lens frame.

5. The device of claim 1, wherein said locking means further comprises a plurality of second tapped holes formed along the same circumference of said lens frame with a phase difference of 1/N of the angular pitch of said recesses with respect to the first group of said tapped holes, where N denotes an integer greater than or equal to 2.

6. The device of claim 1, wherein the number of said recesses is forty-five, said recesses being arranged at 8 degree intervals, and the number of said tapped holes is three, the tapped holes being arranged at 120 degree intervals so as to mate with combinations of three of said recesses.

7. A device for adjusting an optical axial position of a lens, comprising:

means for mounting at least one lens;

means for supporting said mounting means, said supporting means being rotatably and threadably engaged with said mounting means for adjusting the optical axial position of the lens mounted on said mounting means; and means for selectively locking said mounting means to said supporting means at one of a plurality of stepwise, predetermined, relative angular positions after the optical axial position of the lens has been adjusted relative to said supporting means.

8. An optical unit having a device for adjusting an optical axial position of a lens, comprising:

a body of the optical unit;

a lens barrel mounted on said body; said lens barrel comprising a lens frame for mounting at least one lens, a lens frame supporting member threadably, rotatably and adjustably coupled to said lens frame, and a stationary member rotatably coupled to said lens frame supporting member through helicoidal threads, in which an optical axial position of the lens is adjusted by adjustably rotating said lens frame relative to said lens frame supporting member; and means for selectively locking said lens frame to said lens frame supporting member at one of a plurality of stepwise, predetermined, relative angular positions after the optical axial position of the lens has been adjusted, wherein said selective locking means comprises:

a plurality of recesses formed at regular angular intervals along a circumference of said lens frame supporting member;

a plurality of tapped holes formed at other regular angular intervals along a circumference of said lens frame in such a manner that said tapped holes may be associated with any of the recesses; and a plurality of set screws adapted to be engageable through said tapped holes with any of said recesses which are located in the closest association with said tapped holes at the adjusted position for locking said lens frame to said lens frame supporting member.

* * * * *